(12) United States Patent
Byrne et al.

(10) Patent No.: US 11,275,227 B2
(45) Date of Patent: *Mar. 15, 2022

(54) CAMERA FOR VEHICLE VISION SYSTEM WITH REPLACEABLE LENS

(71) Applicant: Magna Electronics Inc., Auburn Hills, MI (US)

(72) Inventors: Steven V. Byrne, Goodrich, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,128

(22) Filed: Jun. 8, 2020

(65) Prior Publication Data

US 2020/0301093 A1    Sep. 24, 2020

Related U.S. Application Data

(63) Continuation of application No. 16/165,253, filed on Oct. 19, 2018, now Pat. No. 10,678,018.

(60) Provisional application No. 62/575,652, filed on Oct. 23, 2017.

(51) Int. Cl.
| | |
|---|---|
| *G02B 7/02* | (2021.01) |
| *G02B 27/00* | (2006.01) |
| *H04N 5/225* | (2006.01) |
| *B60R 1/00* | (2022.01) |
| *B60R 11/04* | (2006.01) |

(52) U.S. Cl.
CPC .............. *G02B 7/021* (2013.01); *B60R 1/00* (2013.01); *B60R 11/04* (2013.01); *G02B 27/0006* (2013.01); *H04N 5/2252* (2013.01); *H04N 5/2253* (2013.01); *H04N 5/2254* (2013.01); *B60R 2300/105* (2013.01); *B60R 2300/30* (2013.01); *B60R 2300/607* (2013.01); *B60R 2300/8066* (2013.01); *G02B 7/025* (2013.01)

(58) Field of Classification Search
CPC ....................................................... B60R 1/00
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,822,133 A * | 10/1998 | Mizuno | G03F 7/70883 359/696 |
| 5,949,331 A | 9/1999 | Schofield et al. | |

(Continued)

*Primary Examiner* — Irfan Habib
(74) *Attorney, Agent, or Firm* — Honigman LLP

(57) ABSTRACT

A camera module for a vehicular vision system includes a camera housing having a rear camera housing portion, a front camera housing portion, and a lens barrel at the front camera housing portion. A lens assembly includes a plurality of optical elements arranged along an optical path for focusing images at an imager. The optical elements include barrel-mounted optical elements disposed in the lens barrel and an outermost optical element disposed at a removable cover element. The cover element is removably attached at an outer end of the lens barrel such that, when attached, the outermost optical element is at an appropriate location relative to the barrel-mounted optical elements for focusing by the plurality of optical elements of images at the imager.

21 Claims, 3 Drawing Sheets

(56) References Cited

U.S. PATENT DOCUMENTS

| | | | |
|---|---|---|---|
| 6,239,924 B1 * | 5/2001 | Watson | G02B 7/022 |
| | | | 359/819 |
| 6,719,215 B2 | 4/2004 | Drouillard | |
| 7,764,447 B2 * | 7/2010 | Shibazaki | G03F 7/70825 |
| | | | 359/822 |
| 7,965,336 B2 | 6/2011 | Bingle et al. | |
| 8,456,771 B2 * | 6/2013 | Weber | B23K 26/02 |
| | | | 359/822 |
| 8,542,451 B2 | 9/2013 | Lu et al. | |
| 8,567,963 B1 | 10/2013 | Criscuolo et al. | |
| 8,994,878 B2 | 3/2015 | Byrne et al. | |
| 9,077,098 B2 | 7/2015 | Latunski | |
| 9,277,104 B2 | 3/2016 | Sesti et al. | |
| 9,596,387 B2 | 3/2017 | Achenbach et al. | |
| 9,621,769 B2 | 4/2017 | Mai et al. | |
| 9,645,392 B2 | 5/2017 | Yoshimura | |
| 10,197,925 B2 * | 2/2019 | Kugler | G02B 7/023 |
| 10,678,018 B2 | 6/2020 | Byrne et al. | |
| 2002/0163741 A1 * | 11/2002 | Shibazaki | G02B 7/022 |
| | | | 359/819 |
| 2006/0139775 A1 * | 6/2006 | Shibazaki | G03F 7/70825 |
| | | | 359/819 |
| 2007/0279768 A1 * | 12/2007 | Shibazaki | G02B 7/023 |
| | | | 359/811 |
| 2008/0055756 A1 * | 3/2008 | Ishikawa | G03F 7/70833 |
| | | | 359/871 |
| 2008/0198352 A1 * | 8/2008 | Kugler | G02B 7/021 |
| | | | 355/66 |
| 2009/0244361 A1 | 10/2009 | Gebauer et al. | |
| 2011/0266375 A1 | 11/2011 | Ono et al. | |
| 2012/0243093 A1 | 9/2012 | Tonar et al. | |
| 2013/0242099 A1 | 9/2013 | Sauer et al. | |
| 2014/0060582 A1 | 3/2014 | Hartranft et al. | |
| 2014/0192410 A1 | 7/2014 | Yoshimura | |
| 2014/0373345 A1 | 12/2014 | Steigerwald | |
| 2015/0124098 A1 * | 5/2015 | Winden | H04N 5/2254 |
| | | | 348/148 |
| 2015/0138357 A1 | 5/2015 | Romack et al. | |
| 2015/0222795 A1 | 8/2015 | Sauer et al. | |
| 2015/0327398 A1 | 11/2015 | Achenbach et al. | |
| 2015/0344001 A1 | 12/2015 | Lopez Galera et al. | |
| 2016/0001330 A1 | 1/2016 | Romack et al. | |
| 2016/0037028 A1 | 2/2016 | Biemer | |
| 2016/0243987 A1 | 8/2016 | Kendall | |
| 2016/0264064 A1 | 9/2016 | Byrne et al. | |
| 2016/0268716 A1 | 9/2016 | Conger et al. | |
| 2016/0286103 A1 | 9/2016 | Van Dan Elzen | |
| 2017/0036647 A1 | 2/2017 | Zhao et al. | |
| 2017/0036650 A1 | 2/2017 | Hester et al. | |
| 2017/0054881 A1 | 2/2017 | Conger et al. | |
| 2017/0133811 A1 | 5/2017 | Conger et al. | |
| 2017/0201661 A1 | 7/2017 | Conger | |
| 2017/0280034 A1 | 9/2017 | Hess et al. | |
| 2017/0295306 A1 | 10/2017 | Mleczko | |
| 2017/0302829 A1 | 10/2017 | Mleczko et al. | |
| 2018/0098033 A1 | 4/2018 | Mleczko et al. | |
| 2019/0124238 A1 | 4/2019 | Byrne et al. | |
| 2019/0124243 A1 | 4/2019 | Mleczko et al. | |

\* cited by examiner

CAMERA FOR VEHICLE VISION SYSTEM WITH REPLACEABLE LENS

CROSS REFERENCE TO RELATED APPLICATIONS

The present application is a continuation of U.S. patent application Ser. No. 16/165,253, filed Oct. 19, 2018, now U.S. Pat. No. 10,678,018, which claims the filing benefits of U.S. provisional application Ser. No. 62/575,652, filed Oct. 23, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras have been proposed for such imaging systems, including cameras of the types described in U.S. Pat. No. 7,965,336 and U.S. Publication No. US-2009-0244361, which are hereby incorporated herein by reference in their entireties.

SUMMARY OF THE INVENTION

The present invention provides a vision system or imaging system for a vehicle that utilizes one or more cameras to capture image data representative of images exterior of the vehicle. The camera or camera module comprises an imager and a circuit board (or circuit boards). The camera comprises a housing having a rear camera housing portion, a front camera housing portion, and a lens barrel at the front camera housing portion. An imager disposed in the housing, and a lens assembly comprising a plurality of optical elements arranged along an optical path is provided for focusing images at the imager. The plurality of optical elements comprise barrel-mounted optics disposed in the lens barrel and an outermost optic disposed at a removable cover element. The cover element is removably attached at the lens barrel such that the outermost optic is at an appropriate location relative to the barrel-mounted optics to provide the lens assembly for focusing of images at the imager. The cover element includes a sealing ring that seals the cover element at the lens barrel when the cover element is fully attached and seated at the lens barrel. Circuitry of the camera module is electrically connected to the imager and is electrically connected to electrical connecting elements that are configured to electrically connect to a wire harness of the vehicle.

Optionally, the cover element may be threadedly attached at the lens barrel. Optionally, the cover element may contact a hard stop when being attached at the lens barrel to set the outermost optic at the appropriate location relative to the barrel-mounted optics for focusing of images at the imager.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
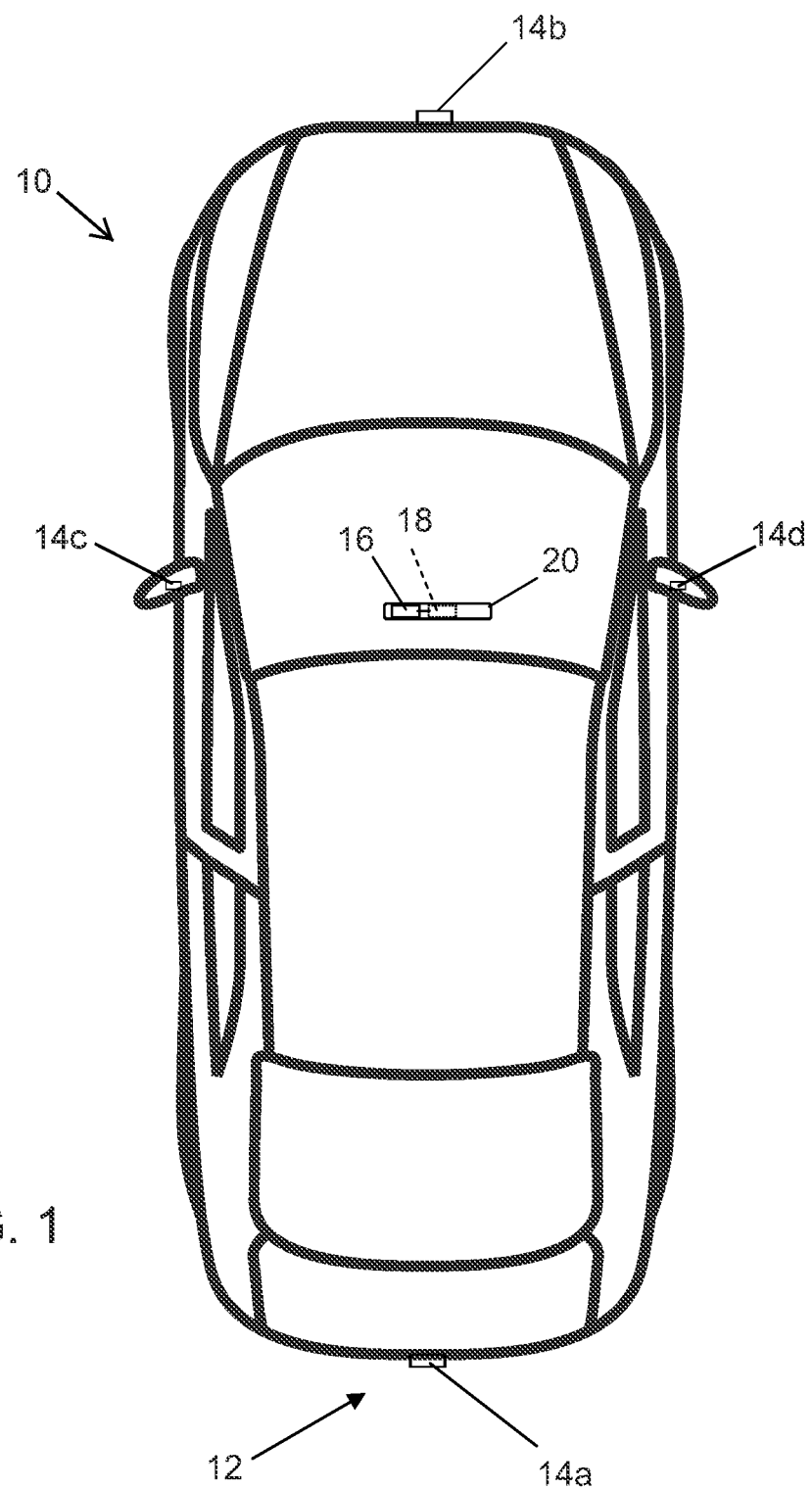
FIG. 1 is a plan view of a vehicle with a vision system that incorporates cameras in accordance with the present invention.
Figure 2:
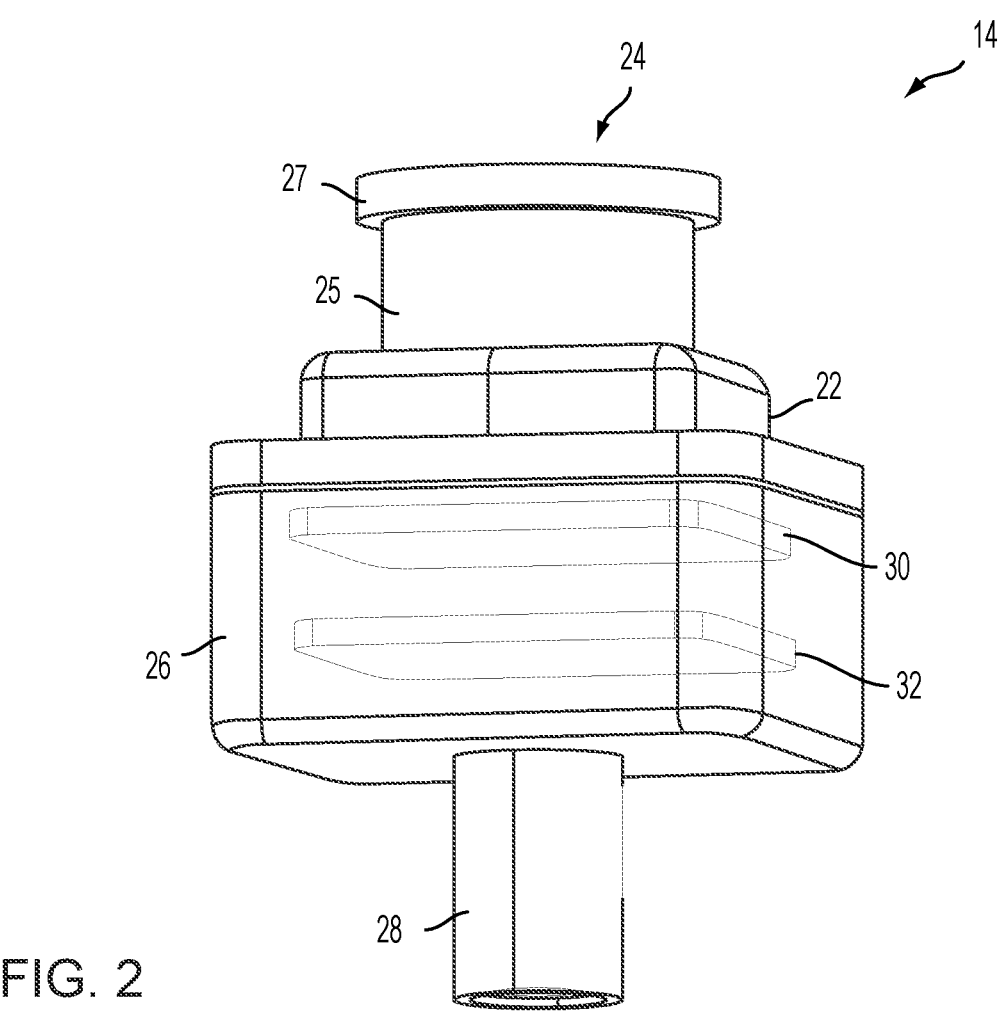
FIG. 2 is a perspective view of a camera module in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera module 14 has a lens holder or front housing portion 22 that holds or supports or houses a lens assembly 24 (which is disposed in a lens barrel 25) and that is attached at a rear housing 26 (that can be metal or plastic) in which an imager printed circuit board (PCB) 30 is disposed. The imager may be adjustably positioned at the housing and optically aligned with the lens assembly (which may be adhesively attached at the housing) and then secured relative to the housing via fasteners or screws or adhesive or the like. The lens assembly includes barrel-mounted lens optics disposed at and in the lens barrel or holder 25 and an outermost lens optic disposed at a removable cover element 27, as discussed in detail below. Another circuit board 32 may be disposed in the camera module with circuitry associated with the imager and camera operation. The circuitry of the PCBs 30, 32 is electrically connected to a connector portion 28 that is configured to electrically connect to a wire harness of the vehicle.

The control unit may comprise or may be part of an autonomous vehicle control system, whereby the cameras capture image data that is processed for use in autonomously controlling the vehicle. High resolution autonomous vehicle cameras and lenses are expected to be costly in comparison to standard automotive cameras. Additionally, each autonomous vehicle may have as many as eight or nine cameras to perform needed functions. The lens of each exterior camera is susceptible to stone or debris damage, which would require frequent and costly camera replacement.

Exterior automotive cameras lenses are susceptible to stone or debris damage, ad each camera must be replaced to correct the damage. Some automotive cameras have a secondary transparent cover included in the camera or vehicle design but these provide very poor optical control for things such as glare and distortion. Debris or fogging between the camera lens and such a cover can be an issue as well.

Figure 3:
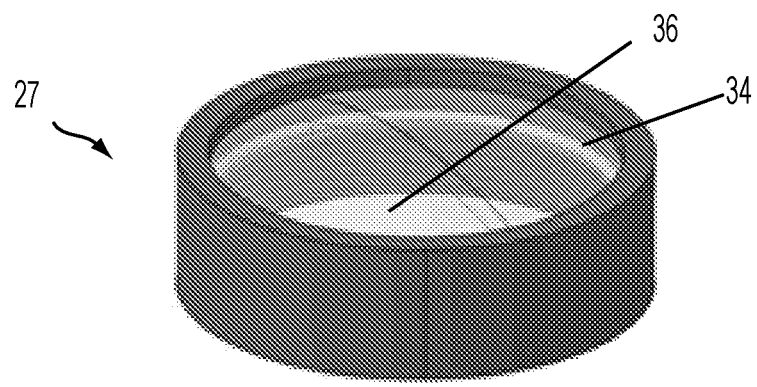
FIG. 3 is an upper or outer perspective view of the cover element and outermost lens optic of the camera of the present invention.
Figure 4:
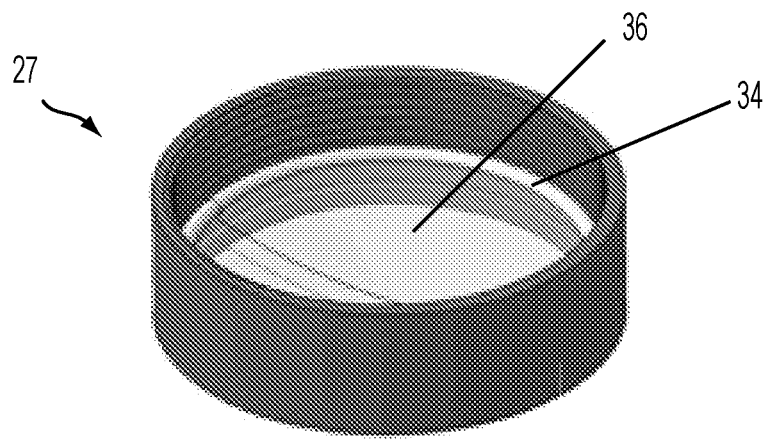
FIG. 4 is a lower or inner perspective view of the cover element and outermost lens optic of FIG. 3.
Figure 5:
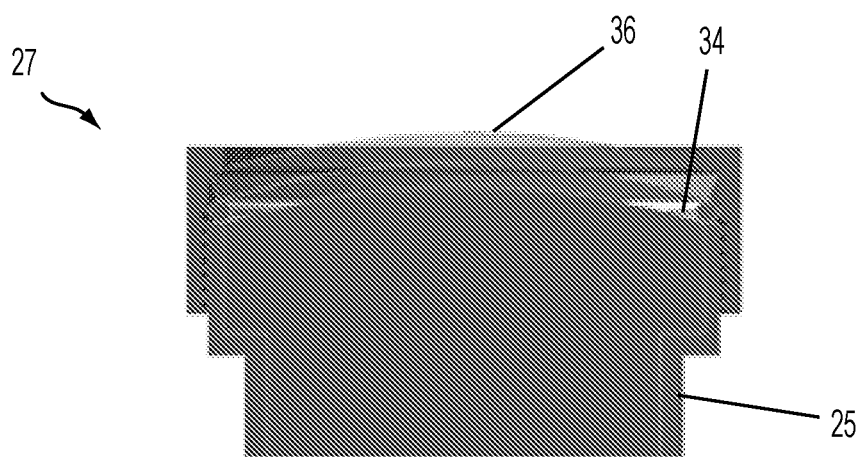
FIG. 5 is a sectional view of the cover element and outermost lens optic attached at the lens barrel of the camera of the present invention.

The autonomous vehicle camera of the present invention includes an additional removable lens or lens optic specifically designed as part of the lens model and included as an integral part of the lens. This lens will include all the optical and performance qualities of a standard automotive camera lens and also be replaceable. The replaced lens will seat to a hard stop, after compressing a seal gasket, to ensure accurate positioning within the optical stack. A likely attachment method may be threads (as shown in FIGS. 3-5) with thread locker material, or the cover element may be threaded or otherwise disposed at the lens barrel and secured via a set screw or the like.

Thus, the lens assembly or stack (that is designed to focus images onto the imager of the camera) comprises a plurality of barrel-mounted lens optics or lens elements disposed in the lens barrel and the outermost replaceable lens optic or element disposed in the removable cover element. Thus, the outermost replaceable lens optic or element is part of the lens stack (and may comprise a glass optic, with at least some of the barrel-mounted optics also comprising glass optics) that is designed to focus images at the image plane of the imager when the imager is focused and optically aligned with the lens. The cover element supports and retains the replaceable lens optic or element and has a seal (such as a compressible rubber seal or O-ring) disposed at an interior side of the replaceable lens optic. The cover element is attached at the lens barrel such that the seal seals against an outer end of the lens barrel and such that the replaceable lens optic is sealed against and at or spaced from the outermost lens optic of the plurality of lens optics disposed in the lens barrel. The lens assembly and lens barrel and cover element are designed such that, when the cover element is fully seated at the lens barrel (such as when a hard stop limits further attachment of the cover element at the lens barrel), the outermost replaceable lens optic is at the appropriate location relative to the rest of the lens stack in the lens barrel, such that the lens assembly is properly configured to focus images onto the imager of the camera.

In the illustrated embodiment, the cover element 27 is threadedly attached to the lens barrel and may be tightened onto the lens barrel 25 to a point where the seal 34 is compressed to seal the replaceable lens optic 36 at the lens barrel to limit or preclude air or moisture from getting around the replaceable lens optic and into the camera module. The hard stop may be where the threads end such that further threading of the cover element onto the lens barrel is limited or precluded, or the hard stop may be at the outer end of the lens barrel, where the hard stop or lens barrel may engage or contact part of the cover element to stop movement of the cover element onto the lens barrel at the appropriate location.

Conditioned air (that may be dried by a desiccant material in the camera cavity) within the camera will be allowed to flow freely up to the lens sealed cap glass to prevent fogging and condensation. Optionally, for example, a channel may be formed along the lens barrel to allow air flow along the lens barrel and between the replaceable lens optic and the next lens optic in the lens stack.

The camera module may utilize aspects of the cameras and connectors described in U.S. Pat. Nos. 9,621,769; 9,596,387; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0054881; US-2017-0133811; US-2017-0201661; US-2017-0280034; US-2017-0295306; US-2017-0302829 and/or US-2018-0098033, and/or U.S. patent application Ser. No. 16/165,170, filed Oct. 19, 2018, and/or Ser. No. 16/165,204, filed Oct. 19, 2018, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234;

9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera module for a vehicular vision system, said camera module comprising:
   a camera housing comprising a rear camera housing portion and a front camera housing portion;
   a lens barrel disposed at and extending from said front camera housing portion;
   an imager disposed at an imager circuit board accommodated by said camera housing;
   a lens assembly comprising a plurality of optical elements for focusing images at said imager;
   wherein said plurality of optical elements comprises (i) barrel-mounted optical elements and (ii) an outermost optical element;
   wherein said barrel-mounted optical elements are disposed in said lens barrel;
   wherein said outermost optical element is disposed at a removable cover element;
   wherein said cover element is removably attached at an outer end of said lens barrel distal from said front camera housing portion;
   wherein said cover element contacts a hard stop when being attached at said outer end of said lens barrel to set said outermost optical element at an appropriate location relative to said barrel-mounted optical elements for focusing by said plurality of optical elements of images at said imager;
   wherein, with said cover element attached at said outer end of said lens barrel, said imager circuit board is adjustably positioned at said front camera housing portion and is adjusted to be optically aligned with said lens assembly and then secured relative to said front camera housing portion; and
   wherein circuitry of said camera module is electrically connected to said imager and is electrically connected to electrical connecting elements that are configured to electrically connect to a wire harness of a vehicle when said camera module is disposed at the vehicle.

2. The camera module of claim 1, wherein said camera module is configured to be disposed at an exterior portion of the vehicle so as to have a field of view exterior of the vehicle when disposed at the exterior portion of the vehicle.

3. The camera module of claim 1, wherein said cover element is threadedly attached at said outer end of said lens barrel.

4. The camera module of claim 3, wherein said cover element contacts the hard stop when being threaded onto threads at said outer end of said lens barrel to set said outermost optical element at the appropriate location relative to said barrel-mounted optical elements for focusing by said plurality of optical elements of images at said imager.

5. The camera module of claim 1, wherein said imager circuit board is secured relative to said front camera housing portion via at least one fastener.

6. The camera module of claim 1, wherein said imager circuit board is secured relative to said front camera housing portion via adhesive.

7. The camera module of claim 1, wherein said barrel-mounted optical elements are fixedly attached in said lens barrel.

8. The camera module of claim 7, wherein said barrel-mounted optical elements are adhesively attached to an inner surface of said lens barrel.

9. A camera module for a vehicular vision system, said camera module comprising:
   a camera housing comprising a rear camera housing portion and a front camera housing portion;
   a lens barrel disposed at and extending from said front camera housing portion;
   an imager disposed at an imager circuit board accommodated by said camera housing;
   a lens assembly comprising a plurality of optical elements for focusing images at said imager;
   wherein said plurality of optical elements comprises (i) barrel-mounted optical elements and (ii) an outermost optical element;
   wherein said barrel-mounted optical elements are disposed in said lens barrel;
   wherein said outermost optical element is disposed at a removable cover element;
   wherein said cover element is removably attached at an outer end of said lens barrel distal from said front camera housing portion;
   wherein said cover element contacts a hard stop when being attached at said outer end of said lens barrel to set said outermost optical element at an appropriate location relative to said barrel-mounted optical elements for focusing by said plurality of optical elements of images at said imager;
   wherein said camera module is configured to be disposed at an exterior portion of a vehicle so as to have a field of view exterior of the vehicle when disposed at the exterior portion of the vehicle; and wherein circuitry of said camera module is electrically connected to said imager and is electrically connected to electrical connecting elements that are configured to electrically connect to a wire harness of the vehicle when said camera module is disposed at the exterior portion of the vehicle.

10. The camera module of claim 9, wherein said cover element is threadedly attached at said outer end of said lens barrel.

11. The camera module of claim 10, wherein said cover element contacts the hard stop when being threaded onto threads at said outer end of said lens barrel to set said outermost optical element at the appropriate location relative to said barrel-mounted optical elements for focusing by said plurality of optical elements of images at said imager.

12. The camera module of claim 9, wherein said imager circuit board is secured relative to said front camera housing portion via at least one fastener.

13. The camera module of claim 9, wherein said imager circuit board is secured relative to said front camera housing portion via adhesive.

14. The camera module of claim 9, wherein said barrel-mounted optical elements are fixedly attached in said lens barrel.

15. The camera module of claim 14, wherein said barrel-mounted optical elements are adhesively attached to an inner surface of said lens barrel.

16. A camera module for a vehicular vision system, said camera module comprising:
    a camera housing comprising a rear camera housing portion and a front camera housing portion;
    a lens barrel disposed at and extending from said front camera housing portion;
    an imager disposed at an imager circuit board accommodated by said camera housing;
    a lens assembly comprising a plurality of optical elements for focusing images at said imager;
    wherein said plurality of optical elements comprises (i) barrel-mounted optical elements and (ii) an outermost optical element;
    wherein said barrel-mounted optical elements are disposed in said lens barrel;
    wherein said outermost optical element is disposed at a removable cover element;
    wherein said cover element is removably attached at an outer end of said lens barrel distal from said front camera housing portion;
    wherein said cover element is threadedly attached at said outer end of said lens barrel;
    wherein said cover element contacts a hard stop when being threadedly attached at said outer end of said lens barrel to set said outermost optical element at an appropriate location relative to said barrel-mounted optical elements for focusing by said plurality of optical elements of images at said imager; and
    wherein circuitry of said camera module is electrically connected to said imager and is electrically connected to electrical connecting elements that are configured to electrically connect to a wire harness of a vehicle when said camera module is disposed at the vehicle.

17. The camera module of claim 16, wherein said cover element contacts the hard stop when being threaded onto threads at said outer end of said lens barrel to set said outermost optical element at the appropriate location relative to said barrel-mounted optical elements for focusing by said plurality of optical elements of images at said imager.

18. The camera module of claim 16, wherein said imager circuit board is secured relative to said front camera housing portion via at least one fastener.

19. The camera module of claim 16, wherein said imager circuit board is secured relative to said front camera housing portion via adhesive.

20. The camera module of claim 16, wherein said barrel-mounted optical elements are fixedly attached in said lens barrel.

21. The camera module of claim 20, wherein said barrel-mounted optical elements are adhesively attached to an inner surface of said lens barrel.

* * * * *